United States Patent
Kang et al.

(10) Patent No.: US 12,520,696 B2
(45) Date of Patent: Jan. 6, 2026

(54) ELECTRONIC DEVICE

(71) Applicant: Samsung Display Co., Ltd., Yongin-si (KR)

(72) Inventors: Hyeoji Kang, Seoul (KR); Taeho Kim, Yongin-si (KR); Ohjeong Kwon, Hwaseong-si (KR); Hongyeon Lee, Suwon-si (KR); Seungyeon Jeong, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 595 days.

(21) Appl. No.: 17/967,753

(22) Filed: Oct. 17, 2022

(65) Prior Publication Data

US 2023/0189611 A1 Jun. 15, 2023

(30) Foreign Application Priority Data

Dec. 14, 2021 (KR) ........................ 10-2021-0179127

(51) Int. Cl.
*H10K 59/38* (2023.01)
*G06F 3/041* (2006.01)
(Continued)

(52) U.S. Cl.
CPC ............. *H10K 59/38* (2023.02); *G06F 3/041* (2013.01); *H10K 59/12* (2023.02); *H10K 59/40* (2023.02); *H10K 59/8792* (2023.02)

(58) Field of Classification Search
CPC ...... H10K 59/38; H10K 50/865; H10K 59/40; H10K 59/12; G06F 3/041
(Continued)

(56) References Cited

U.S. PATENT DOCUMENTS 7,948,585 B2 * 5/2011 Ohtani ................. C09D 11/322
349/108
9,202,855 B1 12/2015 Jo et al.
(Continued)

FOREIGN PATENT DOCUMENTS

KR 10-1753879 B1 4/2015
KR 10-2015-0101106 A 9/2015
(Continued)

OTHER PUBLICATIONS

Takuya Tsuzuki Xungai Wang et al., "Nanoparticle Coatings for UV Protective Textiles", Research Journal of Textile and Apparel, 2010, pp. 9-20, vol. 14(2), Emerald Insight.

*Primary Examiner* — James R Greece
*Assistant Examiner* — Hana S Featherly
(74) *Attorney, Agent, or Firm* — Womble Bond Dickinson (US) LLP (57) ABSTRACT

An electronic device includes a base layer, a light-emitting element layer disposed on the base layer and including a pixel defining film in which an opening is defined and a light-emitting layer disposed in the opening, an inorganic deposition layer disposed on the light-emitting element layer, an encapsulation layer disposed on the inorganic deposition layer, and a light control layer disposed on the encapsulation layer and including a base part, light-absorbing particles having a maximum absorption wavelength of about 370 nm to about 400 nm, and a colorant. Therefore, the electronic device may have excellent optical reliability.

20 Claims, 8 Drawing Sheets
(1 of 8 Drawing Sheet(s) Filed in Color)

(51) Int. Cl.
*H10K 59/12* (2023.01)
*H10K 59/40* (2023.01)
*H10K 59/80* (2023.01)

(58) Field of Classification Search
USPC .......................................................... 313/512
See application file for complete search history.

(56) References Cited

U.S. PATENT DOCUMENTS

| | | |
|---|---|---|
| 10,222,510 B2 | 3/2019 | Song et al. |
| 2020/0075682 A1* | 3/2020 | Jeong .................... G02B 5/0242 |
| 2020/0325372 A1* | 10/2020 | Shah ........................... C09J 7/00 |
| 2020/0381665 A1* | 12/2020 | Song .................... H10K 59/873 |

FOREIGN PATENT DOCUMENTS

| | | |
|---|---|---|
| KR | 10-2251840 B1 | 2/2016 |
| KR | 10-1953775 B1 | 11/2017 |

\* cited by examiner

Light Control Layer　　Light Control Layer
Before UV Irradiation　After UV Irradiation

FIG. 9B

Light Control Layer　　Light Control Layer
Before UV Irradiation　After UV Irradiation

ELECTRONIC DEVICE

CROSS-REFERENCE TO RELATED APPLICATION

This application claims priority to and the benefit of Korean Patent Application No. 10-2021-0179127, filed on Dec. 14, 2021, in the Korean Intellectual Property Office, the content of which is incorporated herein by reference in its entirety.

BACKGROUND

The present disclosure herein relates to an electronic device including a light control layer having light-absorbing particles.

Various electronic devices for multimedia such as a television, a mobile phone, a tablet computer, and/or a game console, have been developed. An electronic device may include various suitable optical functional layers to provide a high-quality color image to a user.

Recently, in order to achieve (e.g., produce) various types or kinds of desired electronic devices, such as an electronic device including a curved surface, a rollable electronic device, and/or a foldable electronic device, research on thin electronic devices has been conducted. Here, by reducing the number of optical functional layers and by including optical functional layers having various suitable functions, an electronic device having a thin thickness may be achieved.

SUMMARY

Aspects according to one or more embodiments of the present disclosure are directed toward an electronic device having suitable or excellent light reliability by including a light control layer having light-absorbing particles.

Additional aspects will be set forth in part in the description which follows and, in part, will be apparent from the description, or may be learned by practice of the presented embodiments of the disclosure.

According to one or more embodiments, an electronic device includes: a base layer; a light-emitting element layer on the base layer and including a pixel defining film in which an opening is defined and a light-emitting layer in the opening; an inorganic deposition layer on the light-emitting element layer; an encapsulation layer on the inorganic deposition layer; and a light control layer on the encapsulation layer and including a base part, light-absorbing particles having a maximum absorption wavelength of about 370 nm to about 400 nm, and a colorant.

In an embodiment, the light-absorbing particles may be about 0.01 wt % to about 5.00 wt % in amount in the light control layer based on a total weight of the light control layer.

In an embodiment, the light-absorbing particles may include at least one of $SiO_2$, $TiO_2$, $CeO_2$, ZnO, $ZrO_2$, $Al_2O_3$, $CaCO_3$, MgO, $GeO_2$, or $Y_2O_3$.

In an embodiment, the light-absorbing particles may have an average diameter of about 5 nm to about 100 nm.

In an embodiment, the colorant may include at least one of an anthraquinone-based compound, a phthalocyanine-based compound, an azo-based compound, a perylene-based compound, a xanthene-based compound, a dimonium-based compound, a dipyrromethene-based compound, a tetraazaporphyrin-based compound, a porphyrin-based compound, a squarylium-based compound, an oxazine-based compound, a triarylmethane-based compound, or a cyanine-based compound.

In an embodiment, the electronic device may further include a sensor layer between the encapsulation layer and the light control layer, wherein the sensor layer is directly on the encapsulation layer.

In an embodiment, the inorganic deposition layer may include at least one of Al, Ag, Mg, Cr, Ti, Ni, Au, Ta, Cu, Ca, Co, Fe, Mo, W, Pt, Yb, $SiO_2$, $TiO_2$, $ZrO_2$, $Ta_2O_5$, $HfO_2$, $Al_2O_3$, ZnO, $Y_2O_3$, BeO, MgO, $PbO_2$, $WO_3$, SiNx, LiF, $CaF_2$, $MgF_2$, or CdS.

In an embodiment, the light control layer may have a minimum perceptible color difference (MPCD) change before and after irradiation with ultraviolet light of about 10 or less.

In an embodiment, the light control layer may have a transmittance of about 10% or less with respect to light having a wavelength of about 370 nm to about 400 nm.

In an embodiment, the light control layer may be provided as a single layer.

In an embodiment, the inorganic deposition layer may be provided as a single layer.

In an embodiment of the present disclosure, an electronic device divided into a light-emitting region and a non-light-emitting region adjacent to the light-emitting region, the electronic device includes: a display module; and a window on the display module, wherein the display module includes a base layer; a light-emitting element layer on the base layer and including a pixel defining film in which an opening overlapping the light-emitting region is defined, and a light-emitting layer in the opening; an inorganic deposition layer on the light-emitting element layer; an encapsulation layer on the inorganic deposition layer; and a light control layer on the encapsulation layer and including a base part, light-absorbing particles, and a colorant and having a transmittance of about 10% or less with respect to light having a wavelength of about 370 nm to about 400 nm, and the light-absorbing particles include at least one of $SiO_2$, $TiO_2$, $CeO_2$, ZnO, $ZrO_2$, $Al_2O_3$, $CaCO_3$, MgO, $GeO_2$, or $Y_2O_3$.

In an embodiment, the light-absorbing particles may have a maximum absorption wavelength in the range of about 370 nm to about 400 nm.

In an embodiment, the light-absorbing particles are about 0.01 wt % to about 5.00 wt % in amount in the light control layer based on a total weight of the light control layer.

In an embodiment, the light-absorbing particles may have an average diameter of about 5 nm to about 100 nm.

In an embodiment, the light control layer may overlap the light-emitting region and the non-light-emitting region, and may be provided as a single layer.

In an embodiment, the light control layer may be on an uppermost part of the display module.

In an embodiment, the inorganic deposition layer may overlap the light-emitting region and the non-light-emitting region, and may be provided as a single layer.

In an embodiment, the inorganic deposition layer may include at least one of Al, Ag, Mg, Cr, Ti, Ni, Au, Ta, Cu, Ca, Co, Fe, Mo, W, Pt, Yb, $SiO_2$, $TiO_2$, $ZrO_2$, $Ta_2O_5$, $HfO_2$, $Al_2O_3$, ZnO, $Y_2O_3$, BeO, MgO, $PbO_2$, $WO_3$, SiNx, LiF, $CaF_2$, $MgF_2$, or CdS.

In an embodiment, the light control layer may not include any polarization layer.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings are included to provide a further understanding of the present disclosure, and are incorporated in and constitute a part of this disclosure. The drawings illustrate embodiments of the present disclosure and, together with the description, serve to explain principles of the present disclosure. In the drawings.

DETAILED DESCRIPTION

The present disclosure may be implemented in various suitable modifications and have various suitable forms, and specific embodiments are illustrated in the drawings and described in more detail in the text. It is to be understood, however, that the present disclosure is not intended to be limited to the particular forms disclosed, but on the contrary, is intended to cover all modifications, equivalents, and alternatives falling within the spirit and scope of the subject matter of the present disclosure.

In this specification, it will be understood that when an element or layer is referred to as being "on", "connected to" or "coupled to" another element or layer, it can be directly on, connected or coupled to the other element or layer, or intervening elements or layers may be present.

On the other hand, in the present application, the term "directly disposed" or "directly on" refers to that there is no intervening (e.g., additional) layer, film, region, plate, and/or the like added between two layers, films, or regions, for example, "directly disposed" or "directly on" may refer to that no additional members such as adhesive members are present between two layers or two members.

Like reference numerals or symbols refer to like elements throughout. The thickness, the ratio, and/or the dimension of the element may be exaggerated for effective description of the technical contents.

As used herein, the term "and/or" includes any and all combinations of one or more of the associated listed items.

It will be understood that, although the terms first, second, and/or the like may be used herein to describe various components, these components should not be limited by these terms. These terms are only used to distinguish one component from another component. Thus, a first component discussed below could be termed a second component without departing from the teachings of the present disclosure, and similarly, the second component could also be referred to as the first component. As used herein, the singular forms are intended to include the plural forms as well, unless the context clearly indicates otherwise. For example, the singular forms "a", "an" and "the" are intended to include the plural forms as well, unless the context clearly indicates otherwise.

Spatially relative terms, such as "beneath", "below", "lower", "above", "upper" and/or the like, may be used herein for ease of description to describe one element or feature's relationship to another element(s) or feature(s) as illustrated in the drawings. The terms are relative concepts and are described based on the directions indicated in the drawings. In this specification, the term "below" can encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "include(s)" and/or "including", when used in this specification, specify the presence of stated feature(s), integer(s), step(s), operation(s), element(s), and/or component(s), but do not preclude the presence or addition of one or more other features, integers, steps, operations, elements, components, and/or groups thereof.

Hereinafter, an electronic device according to an embodiment of the present disclosure will be described with reference to the accompanying drawings.

Figure 1:
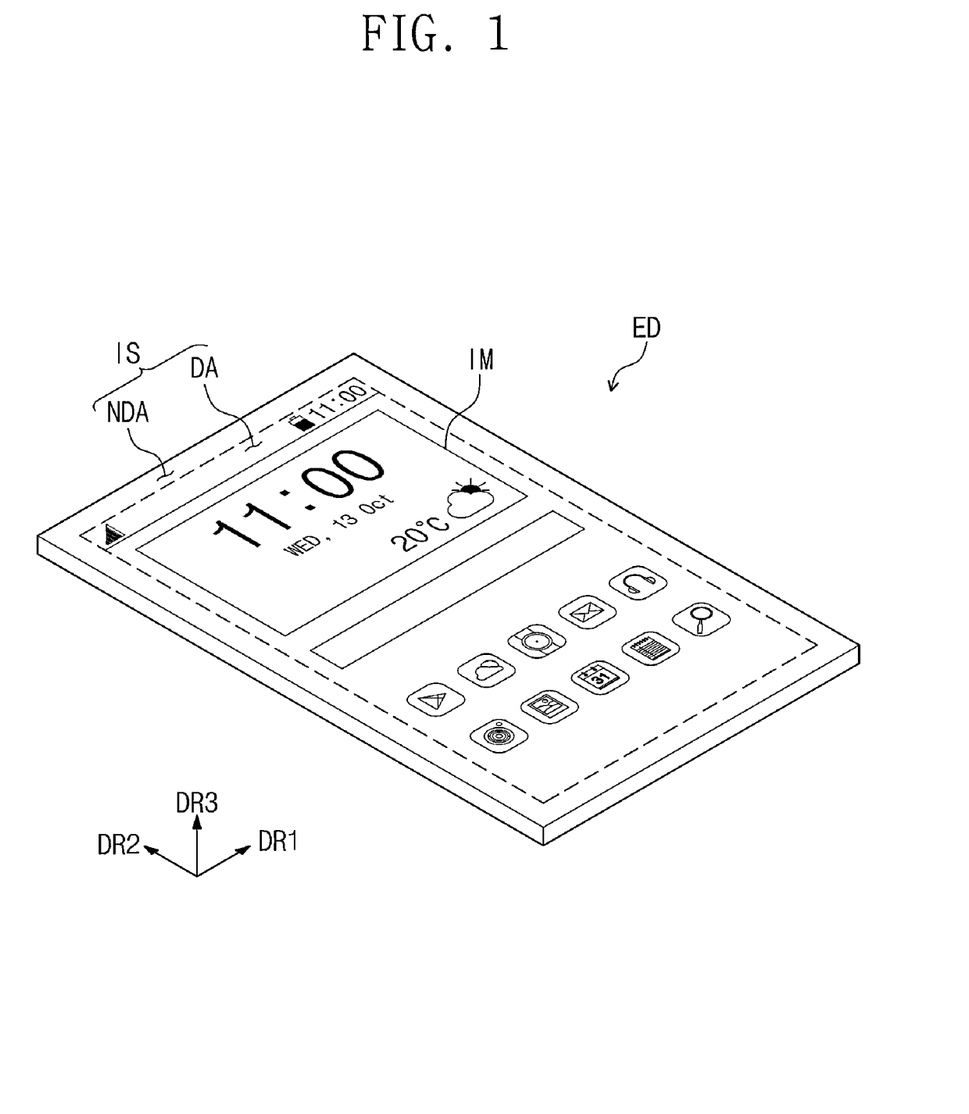
FIG. 1 is a perspective view of an electronic device according to an embodiment.

FIG. 1 is a perspective view of an electronic apparatus according to an embodiment. FIG. 1 illustrates an example portable electronic device as an electronic device ED. However, the electronic device ED may be utilized in not only a relatively large electronic device such as a television, a monitor, and/or an external billboard, but also a relatively small- or medium-sized electronic device such as a personal computer, a notebook computer, a personal digital terminal, a car navigation unit, a game machine, a smartphone, a tablet, and/or a camera. In addition, these are presented only as examples, and the electronic device EA may also be utilized in other electronic apparatuses without departing from the present disclosure.

The electronic device ED may have a hexahedral shape having a thickness in a third direction axis DR3 on a plane defined by a first direction axis DR1 and a second direction axis DR2 crossing the first direction axis DR1. However, this is illustrated by way of example, and the electronic device ED may have various suitable shapes and is not limited to any one embodiment.

In an embodiment, an upper surface (or a front surface) and a lower surface (or a rear surface) of each member are defined based on a direction in which an image IM is displayed. The upper and lower surfaces may be opposite to each other in the direction of the third direction axis DR3, and a normal line direction of each of the upper and lower surfaces may be parallel to the direction of the third direction axis DR3.

Meanwhile, the directions indicated as the first to third directional axes DR1, DR2, and DR3 may have a relative concept and may thus be suitably changed to other directions. Hereinafter, the first to third directions are the directions respectively indicated by the first to third direction axes DR1, DR2, and DR3 and are referred to by the same reference numerals or symbols.

The electronic device ED may display an image IM through a display surface IS. The display surface IS includes a display region DA on which an image IM is displayed and a non-display region NDA adjacent to the display region DA. The non-display region NDA is a region in which the image is not displayed (e.g., a region in which no image is displayed). The image IM may include static images and/or dynamic images. In FIG. 1A, a plurality of application icons, a clock, and/or the like are illustrated as an example of the image IM.

The display region DA may have a rectangular shape. The non-display region NDA may surround the display region DA. However, an embodiment of the present disclosure is not limited thereto, and the shape of the display region DA and the shape of the non-display region NDA may be relatively designed. In an embodiment, the non-display region NDA may not be present on a front surface of the electronic device ED.

The electronic device ED may be flexible. This refers to the characteristics of being bendable, and the electronic device may include any structures from a fully folded structure to a structure that may be bent to a level of several nanometers. For example, the electronic device ED may be a curved electronic device or a foldable electronic device. However, an embodiment of the present disclosure is not limited thereto, and the electronic device ED may be rigid.

Figure 2:
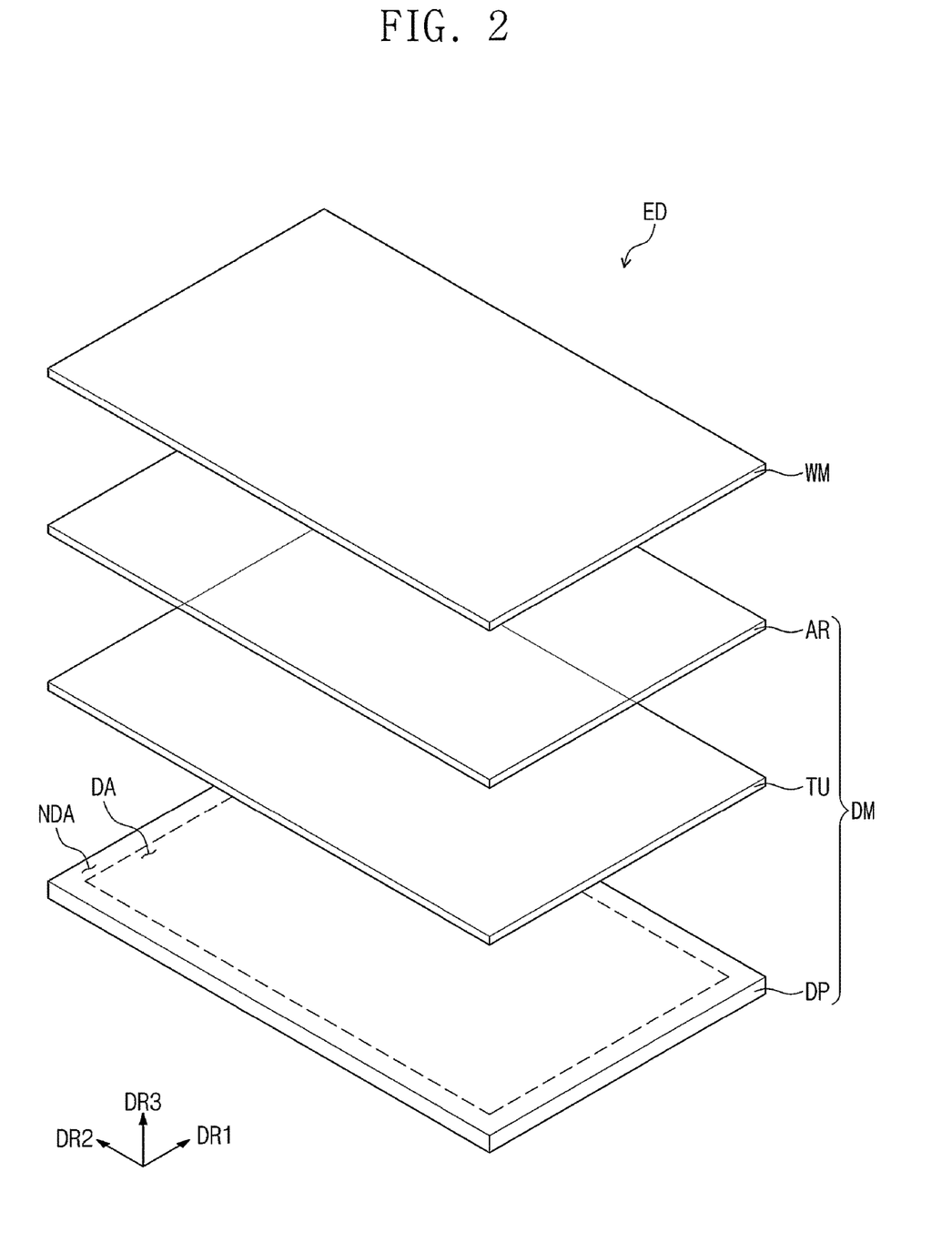
FIG. 2 is an exploded perspective view of an electronic device according to an embodiment.

FIG. 2 is an exploded perspective view of an electronic device according to an embodiment. Referring to FIG. 2, the electronic device ED may include a display module DM and a window WM that are sequentially stacked along the third direction axis DR3. The display module DM may include a display panel DP and a light control layer AR disposed on the display panel DP. The display module DM may further include a sensor layer TU disposed between the display panel DP and the light control layer AR.

Figure 3:
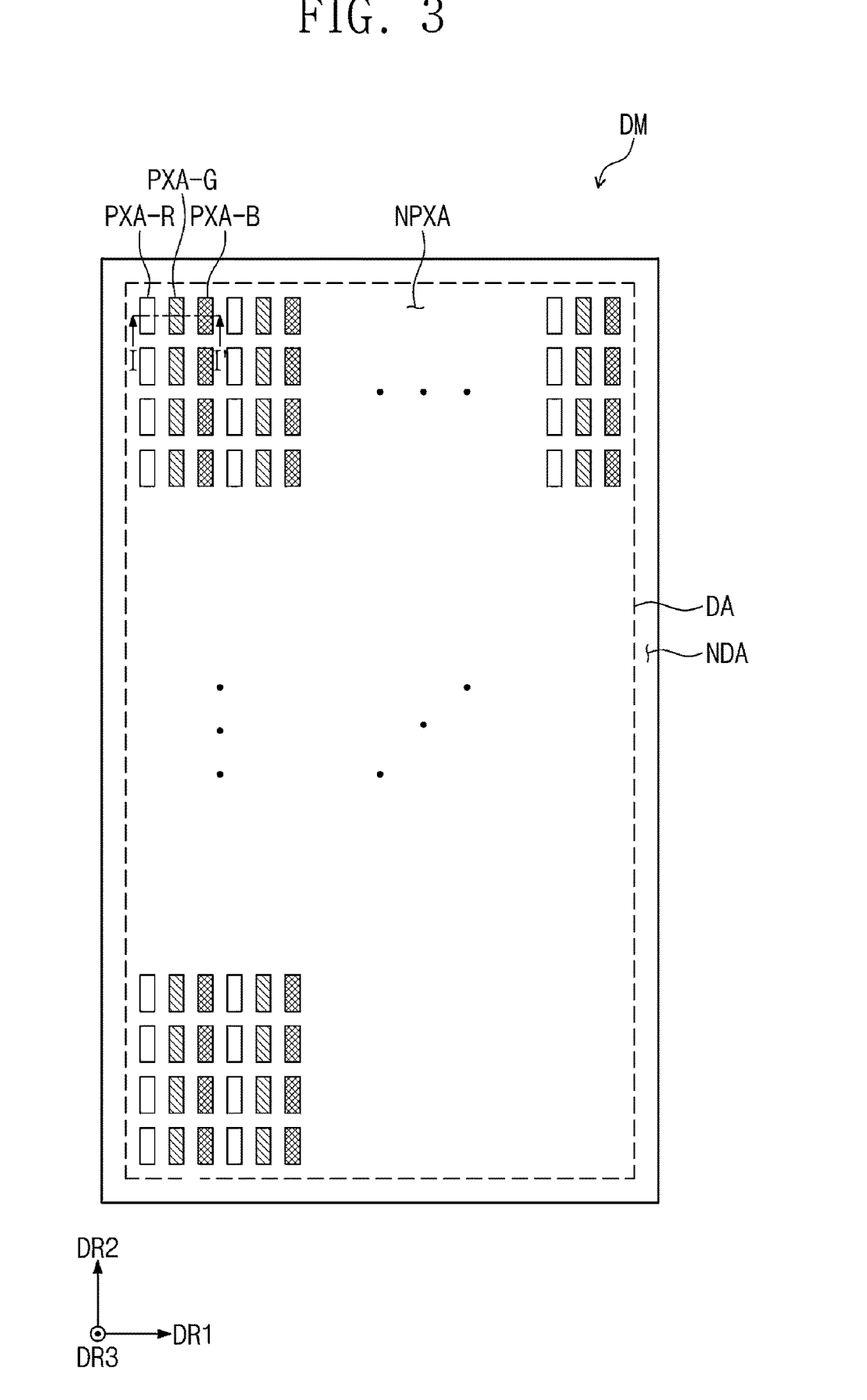
FIG. 3 is a plan view of a display module according to an embodiment.

The display panel DP may include a plurality of pixels in a region corresponding to the electronic device ED. The plurality of pixels may correspond to the plurality of light-emitting regions PXA-R, PXA-B, and PXA-G (FIG. 3). The plurality of pixels may display (e.g., emit) light in response to an electrical signal. Due to the plurality of pixels, the display region DA may display the image IM (FIG. 1) generated by the light.

The display panel DP may be a self-luminous display panel. For example, the display panel DP may be a micro-LED display panel, a nano LED display panel, an organic light-emitting display panel, or a quantum dot light-emitting display panel. However, this is only an example, and the self-luminous display panel is not limited thereto.

A light-emitting layer of the organic light-emitting display panel may include an organic light-emitting material. A light-emitting layer of the quantum-dot light-emitting display panel may include quantum dots and/or quantum rods. The micro-LED display panel may include a micro light-emitting diode element, which is a micro light-emitting element (e.g., in the micro-meter scale), and the nano LED display panel may include a nano light-emitting diode element (e.g., in the nano-meter scale). Hereinafter, the display panel DP is described as the organic light-emitting display panel.

The light control layer AR may be disposed on the display panel DP. The light control layer AR may be disposed on the uppermost part of the display module DM. The light control layer AR may be an anti-reflection layer that reduces reflectance due to external light incident from the outside. The light control layer AR may be a layer that selectively transmits light emitted from the display panel DP.

The light control layer AR may not include any polarization layer. That is, the light control layer AR may exclude a polarization layer. Accordingly, light passing through the light control layer AR and incident onto the display panel DP and the sensor layer TU may be unpolarized light. The display panel DP and the sensor layer TU may receive unpolarized light from the light control layer AR above.

The sensor layer TU may be disposed between the display panel DP and the light control layer AR. The sensor layer TU may acquire information for generating an image on the display panel DP by an external input. The external input may be an input of a user. The input of the user may include various suitable types or kinds of external inputs such as through a portion of the user's body, light, heat, a pen, or pressure.

Figure 4:
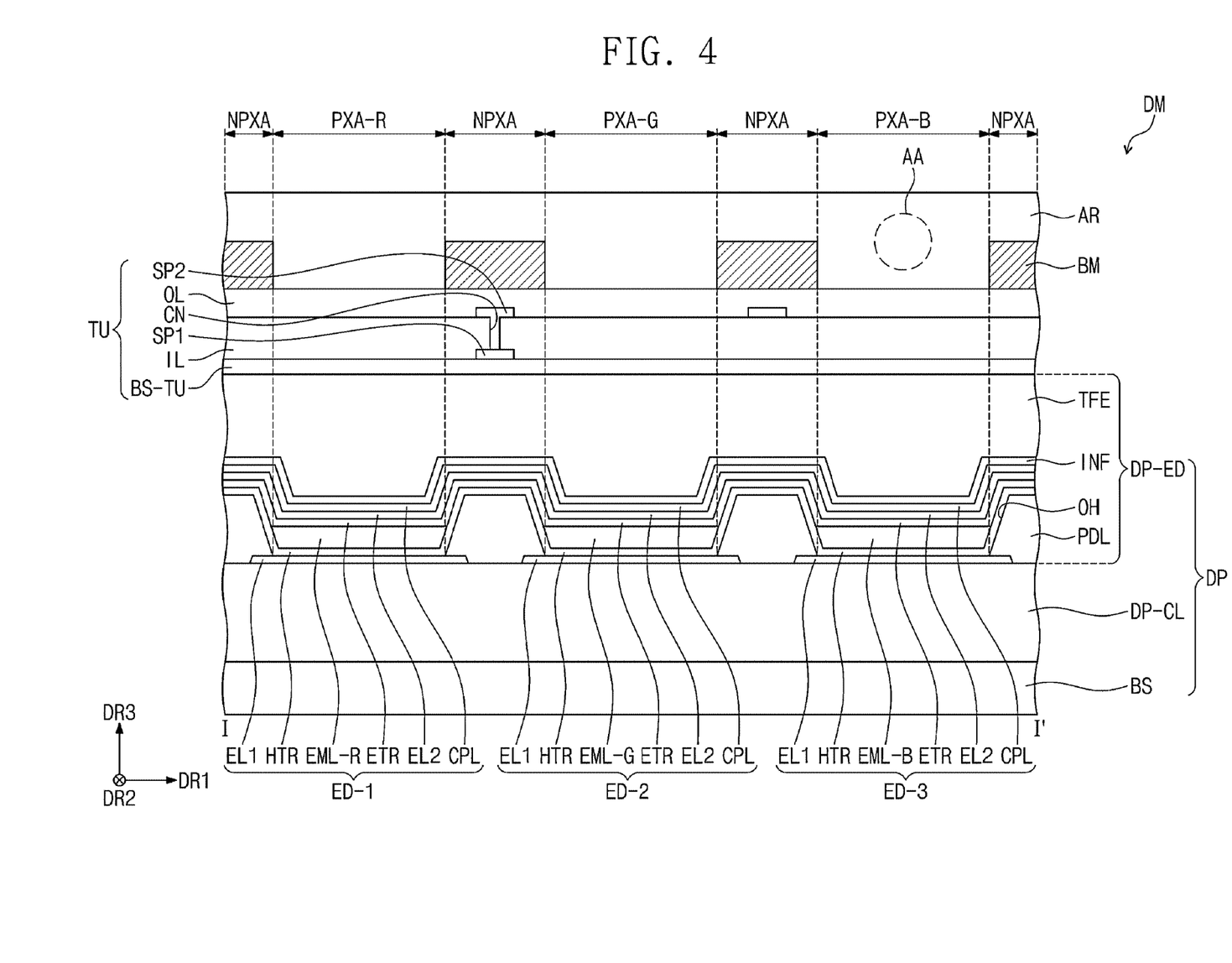
FIG. 4 is a cross-sectional view of a display module according to an embodiment.

FIG. 3 is a plan view of a display module according to an embodiment. FIG. 4 is a cross-sectional view of a display module according to an embodiment. FIG. 4 is a cross-sectional view taken along the line I-I' of FIG. 3 in a display module according to an embodiment.

Referring to FIGS. 3 and 4, the display panel DP may include a base layer BS, a circuit layer DP-CL, and a display element layer DP-ED that are sequentially stacked. The display element layer DP-ED may include pixel defining films PDL, light-emitting elements ED-1, ED-2, and ED-3 defined by (e.g., disposed in the DR1 direction between) the pixel defining films PDL, an encapsulation layer TFE disposed on the light-emitting elements ED-1, ED-2, and ED-3, and an inorganic deposition layer INF disposed (in the DR2 direction) between the light-emitting elements ED-1, ED-2, and ED-3 and the encapsulation layer TFE.

The base layer BS may be a member that provides a base surface on which the circuit layer DP-CL is disposed. The base layer BS may be a glass substrate, a metal substrate, a polymer substrate, and/or the like. However, an embodiment of the present disclosure is not limited thereto, and the base layer BS may be an inorganic layer, an organic layer, or a composite material layer.

In an embodiment, the circuit layer DP-CL may be disposed on the base layer BS, and may include a plurality of transistors. The transistors may each include a control electrode, an input electrode, and an output electrode. For example, the circuit layer DP-CL may include a switching transistor and a driving transistor for driving the light-emitting elements ED-1, ED-2, and ED-3 of the display element layer DP-ED.

Each of the light-emitting elements ED-1, ED-2, and ED-3 may include a first electrode EL1, a hole transport region HTR, a corresponding light-emitting layer EML-R, EML-G, or EML-B, an electron transport region ETR, and a second electrode EL2. Each of the light-emitting elements ED-1, ED-2, and ED-3 may include a capping layer CPL disposed on the second electrode EL2.

FIG. 4 illustrates an embodiment in which the light-emitting layers EML-R, EML-G, and EML-B of the light-emitting elements ED-1, ED-2, and ED-3 are disposed in openings OH defined in the pixel defining films PDL, and the hole transport region HTR, the electron transport region ETR, the second electrode EL2, and the capping layer CPL are provided as common layers in all of the light-emitting elements ED-1, ED-2, ED-3. However, an embodiment of the present disclosure is not limited thereto, and in an embodiment unlike the configuration illustrated in FIG. 4, the hole transport region HTR and the electron transport region ETR may be provided by being patterned inside the openings OH defined in the pixel defining films PDL. For example, in an embodiment, at least one of the hole transport region HTR, the light-emitting layers EML-R, EML-G, and EML-B, or the electron transport region ETR of the light-emitting elements ED-1, ED-2, and ED-3 may be provided by being patterned through an inkjet printing method.

The encapsulation layer TFE may cover the light-emitting elements ED-1, ED-2, and ED-3. The encapsulation layer TFE may seal the display element layer DP-ED. The encapsulation layer TFE may be a thin film encapsulation layer. The encapsulation layer TFE may be a single layer or a stack of a plurality of layers. The encapsulation layer TFE includes at least one insulating layer. The encapsulation layer TFE according to an embodiment may include at least one inorganic film (hereinafter, an inorganic encapsulation film). In addition, the encapsulation layer TFE according to an embodiment may include at least one organic film (hereinafter, an organic encapsulation film) and at least one inorganic encapsulation film.

The inorganic encapsulation film protects the display element layer DP-ED from moisture/oxygen, and the organic encapsulation film protects the display element layer DP-ED from foreign substances such as dust particles. The inorganic encapsulation film may include silicon nitride, silicon oxynitride, silicon oxide, titanium oxide, aluminum oxide, and/or the like, but is not particularly limited thereto. The organic encapsulation film may include an acrylic compound, an epoxy-based compound, and/or the like. The organic encapsulation film may include a photopolymerizable organic material, but is not particularly limited. The encapsulation layer TFE may be disposed on the second electrode EL2, and may be disposed to fill the openings OH.

The electronic device ED may include non-light-emitting regions NPXA and light-emitting regions PXA-R, PXA-G, and PXA-B. The light-emitting regions PXA-R, PXA-G, and PXA-B may be regions in which light generated by the respective light-emitting elements ED-1, ED-2, and ED-3 is emitted. The light-emitting regions PXA-R, PXA-G, and PXA-B may be spaced apart from each other on a plane (e.g., in a plan view).

Each of the light-emitting regions PXA-R, PXA-G, and PXA-B may be a region divided (e.g., defined) by the pixel defining layer PDL. The non-light-emitting regions NPXA may be located between the adjacent light-emitting regions PXA-B, PXA-G, and PXA-R and may correspond to the pixel defining films PDL. Meanwhile, in the present specification, the light-emitting regions PXA-B, PXA-G, and PXA-R may each respectively correspond to a pixel. The pixel defining films PDL may divide the light-emitting elements ED-1, ED-2, and ED-3. The light-emitting layers EML-R, EML-G, and EML-B of the light-emitting elements ED-1, ED-2, and ED-3 may be disposed in the openings OH defined in the pixel defining films PDL and thus divided (e.g., separated) from each other.

The light-emitting regions PXA-B, PXA-G, and PXA-R may be classified into a plurality of groups according to the color of light generated from the light-emitting elements ED-1, ED-2, and ED-3. In the electronic device ED according to an embodiment illustrated in FIGS. 2 and 3, three light-emitting regions PXA-R, PXA-G, and PXA-B respectively emitting red light, green light, and blue light are illustrated as an example. For example, the electronic device ED according to an embodiment may include a red light-emitting region PXA-R, a green light-emitting region PXA-G, and a blue light-emitting region PXA-B that are distinct from each other.

In the electronic device ED according to an embodiment, the plurality of light-emitting elements ED-1, ED-2, and ED-3 may emit light of different wavelength ranges. For example, in an embodiment, the electronic device ED may include a first light-emitting element ED-1 for emitting red light, a second light-emitting element ED-2 for emitting green light, and a third light-emitting element ED-3 for emitting blue light. That is, the red light-emitting region PXA-R, the green light-emitting region PXA-G, and the blue light-emitting region PXA-B of the electronic device ED may respectively correspond to the first light-emitting element ED-1, the second light-emitting element ED-2, and the third light-emitting element ED-3.

However, an embodiment of the present disclosure is not limited thereto, and the first to third light-emitting elements ED-1, ED-2, and ED-3 may emit light of the same wavelength range or at least one of the first to third light-emitting elements ED-1, ED-2, or ED-3 may emit light of a different wavelength range. For example, in an embodiment, the first to third light-emitting elements ED-1, ED-2, and ED-3 may all emit blue light.

The light-emitting regions PXA-R, PXA-G, and PXA-B in the electronic device ED according to an embodiment may be arranged in a stripe shape. Referring to FIG. 3, a plurality of red light-emitting regions PXA-R may be aligned with each other along the second direction axis DR2, a plurality of green light-emitting regions PXA-G may be aligned with each other along the second direction axis DR2, and a plurality of blue light-emitting regions PXA-B may be aligned with each other along the second direction axis DR2. In addition, the light-emitting regions may be alternately arranged in the order of the red light-emitting region PXA-R, the green light-emitting region PXA-G, and the blue light-emitting region PXA-B along the first direction axis DR1.

FIGS. 3 and 4 illustrate that areas (e.g., the size) of the light-emitting regions PXA-R, PXA-G, and PXA-B are all similar, but an embodiment of the present disclosure is not limited thereto. Thus, the areas of the light-emitting regions PXA-R, PXA-G, and PXA-B may be different from each other depending on the wavelength range of the emitted light. Here, the areas of the light-emitting regions PXA-R, PXA-G, and PXA-B may refer to an area as viewed on a plane defined by the first direction axis DR1 and the second direction axis DR2 (e.g., in a plan view).

Meanwhile, an arrangement form of the light-emitting regions PXA-R, PXA-G, and PXA-B is not limited to that illustrated in FIG. 3, and an order, in which the red light-emitting region PXA-R, the green light-emitting region PXA-G, and the blue light-emitting region PXA-B are arranged, may be provided in various suitable combinations according to the characteristics of display quality required or desired for the electronic device ED. For example, the arrangement form of the light-emitting regions PXA-R, PXA-G, and PXA-B may be a PENTILE® arrangement or diamond arrangement form. PENTILE® is a trademark of Samsung Display Co., Ltd.

In an embodiment, the areas of the light-emitting regions PXA-R, PXA-G, and PXA-B may be different from each other. For example, in an embodiment, the area of the green light-emitting region PXA-G may be smaller than the area of the blue light-emitting region PXA-B, but an embodiment of the present disclosure is not limited thereto.

The display panel DP according to an embodiment may include an inorganic deposition layer INF disposed on the light-emitting elements ED-1, ED-2, and ED-3. The inorganic deposition layer INF may be disposed on the capping layer CPL. The inorganic deposition layer INF may be disposed directly on the capping layer CPL. The inorganic deposition layer INF may be a layer for preventing or reducing reflection of external light by the second electrode EL2 of the light-emitting elements ED-1, ED-2, and ED-3. For example, destructive interference occurs between the light reflected from the surface of the inorganic deposition layer INF and the light reflected from the second electrode EL2, and thus the amount of external light reflected from the surface of the second electrode EL2 may be reduced. The thickness of the inorganic deposition layer INF and the capping layer CPL may be controlled so that destructive interference may occur between the light reflected from the surface of the inorganic deposition layer INF and the light reflected from the second electrode EL2.

The inorganic deposition layer INF may include an inorganic material having a refractive index of about 1.0 or more and a light absorption coefficient of about 0.5 or more. The inorganic deposition layer INF may be formed through a thermal deposition process, and may include an inorganic material having a melting point of about 1000° C. or less. The inorganic deposition layer INF may include, for example, at least one of Al, Ag, Mg, Cr, Ti, Ni, Au, Ta, Cu, Ca, Co, Fe, Mo, W, Pt, Yb, $SiO_2$, $TiO_2$, $ZrO_2$, $Ta_2O_5$, $HfO_2$, $Al_2O_3$, ZnO, $Y_2O$, BeO, MgO, $PbO_2$, $WO_3$, $SiN_x$, LiF, $CaF_2$, $MgF_2$, or CdS. In an embodiment, the encapsulation layer TFE may be directly disposed on the inorganic deposition layer INF.

FIG. 4 illustrates an embodiment in which the inorganic deposition layer INF is provided as a common layer in all of the light-emitting regions PXA-R, PXA-G, and PXA-B and the non-light-emitting regions NPXA. However, an embodiment is not limited thereto, and in an embodiment, the inorganic deposition layer INF may be patterned and provided inside the openings OH defined in the pixel defining films PDL.

In an embodiment, the light control layer AR may be disposed on the display panel DP. In an embodiment, the light control layer AR may entirely overlap the display element layer DP-ED. In an embodiment, the light control layer AR may entirely overlap (e.g., cover) each of the first light-emitting element ED-1, the second light-emitting element ED-2, and the third light-emitting element ED-3. In an embodiment, the light control layer AR may overlap the light-emitting regions PXA-R, PXA-G, and PXA-B and the non-light-emitting regions. The light control layer AR may be provided as one layer. The light control layer AR may cover the front surface of the display panel DP to protect the display panel DP. A portion of light emitted from the display panel DP passing through the light control layer AR may be absorbed and a portion of the light may be transmitted to improve the color gamut. The color gamut refers to a range of colors that an electronic device may represent (e.g., capable of providing). For example, the color gamut may be improved by selectively absorbing light in a specific wavelength region. The characteristics of the light control layer AR will be described in more detail with reference to FIG. 5.

In an embodiment, the electronic device ED may further include partition wall portions BM disposed on the display element layer DP-ED, covered by the light control layer AR, and overlapping the non-light-emitting region NPXA. The partition wall portions BM may be disposed to be spaced apart from each other. The partition wall portions BM may prevent or reduce a light leakage phenomenon. The partition wall portions BM may be a light blocking member. The partition wall portions BM may include an organic light blocking material, black pigment and/or black dye, and/or the like. The light control layer AR may fill spaces between the partition wall portions BM that are spaced apart from each other.

In an embodiment, the sensor layer TU may include a sensor base layer BS-TU, a first conductive layer SP1, an inorganic insulating layer IL, a second conductive layer SP2, and an organic insulating layer OL. The first conductive layer SP1 may be disposed on the sensor base layer BS-TU. The inorganic insulating layer IL may cover the first conductive layer SP1, and may be disposed on the sensor base layer BS-TU and the first conductive layer SP1. The second conductive layer SP2 may be disposed on the inorganic insulating layer IL. The organic insulating layer OL may cover the second conductive layer SP2, and may be disposed on the inorganic insulating layer IL and the second conductive layer SP2.

The sensor base layer BS-TU may be an inorganic layer including at least one of silicon nitride, silicon oxynitride, or silicon oxide. Alternatively, in an embodiment, the sensor base layer BS-TU may be an organic layer including an epoxy resin, an acryl resin, and/or an imide-based resin. The sensor base layer BS-TU may have a single-layer structure or a multilayer structure in which layers are stacked along the third direction axis DR3.

Each of the first conductive layer SP1 and the second conductive layer SP2 may have a single-layer structure or a multilayer structure in which layers are stacked along the third direction axis DR3. Single-layered conductive layers SP1 and SP2 may include a metal layer or a transparent conductive layer. The metal layer may include molybdenum, silver, titanium, copper, aluminum, and/or an alloy thereof. A transparent conductive layer may include a transparent conductive oxide such as indium tin oxide (ITO), indium zinc oxide (IZO), zinc oxide (ZnO), and/or indium zinc tin oxide (IZTO). In addition, the transparent conductive layer may include a conductive polymer such as PEDOT, metal nanowires, graphene, and/or the like.

The multilayered conductive layers SP1 and SP2 may include metal layers. The metal layers may have, for example, a tri-layer structure of titanium (Ti)/aluminum (Al)/titanium (Ti). In an embodiment, the conductive layer SP1 and SP2 having the multilayer structure may include at least one metal layer and at least one transparent conductive layer.

The inorganic insulating layer IL may include at least one of aluminum oxide, titanium oxide, silicon oxide, silicon nitride, silicon oxynitride, zirconium oxide, or hafnium oxide.

A contact hole CN may be defined in the inorganic insulating layer IL. The first conductive layer SP1 and the second conductive layer SP2 may be electrically connected with each other through (e.g., via) the contact hole (e.g., contact via) CN. The contact hole CN may be filled with a material of the second conductive layer SP2. FIG. 4 illustrates that one contact hole CN is defined in the inorganic insulating layer IL, but an embodiment is not limited thereto, and a plurality of contact holes may be defined in the inorganic insulating layer.

The organic insulating layer OL may cover the inorganic insulating layer IL and the second conductive layer SP2. The organic insulating layer OL may include at least one of an acryl-based resin, a methacrylic resin, polyisoprene, a vinylbased resin, an epoxy-based resin, a urethane-based resin, a cellulose-based resin, a siloxane-based resin, a polyimide-based resin, a polyamide-based resin, or a perylene-based resin.

Figure 5:
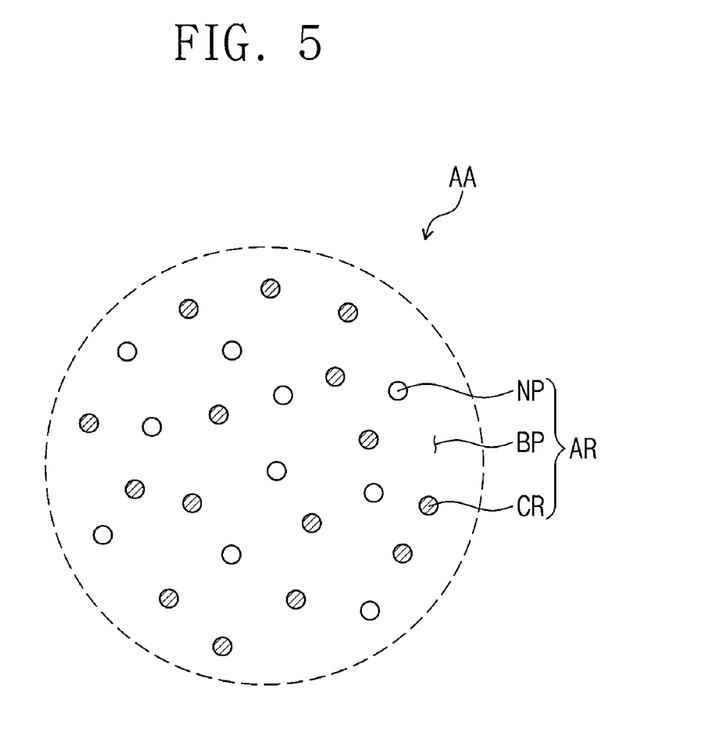
FIG. 5 is an enlarged view of a portion of a light control layer according to an embodiment.

FIG. 5 is an enlarged view of a portion of a light control layer according to an embodiment. FIG. 5 is an enlarged view of a portion indicated by the dotted line AA in FIG. 4 of a display module according to an embodiment.

Referring to FIGS. 4 and 5, in an embodiment, the light control layer AR may include a colorant CR, light-absorbing particles NP, and a base part (e.g., a base) BP.

The colorant CR may absorb light of a specific wavelength. The light control layer AR according to an embodiment may include a plurality of colorants (e.g., a plurality of different kinds of colorants) CR that absorb light of different wavelengths. For example, the light control layer may each include a colorant that absorbs light having a wavelength of about 480 nm to about 500 nm, and another colorant that absorbs light having a wavelength of about 585 nm to about 600 nm. As the colorant CR included in the light control layer AR absorbs a specific wavelength and transmits light in a remaining wavelength range, the light control layer AR may prevent or reduce reflection by external light and may adjust the color tone of the light emitted from the display panel DP.

The colorant CR may include at least one of a pigment or a dye. For example, the colorant CR may include at least one selected from the group consisting of an anthraquinone-based compound, a phthalocyanine-based compound, an azo-based compound, a perylene-based compound, a xanthene-based compound, a diimmonium-based compound, a dipyrromethene-based compound, a tetraazaporphyrin-based compound, a porphyrin-based compound, a squarylium-based compound, an oxazine-based compound, a triarylmethane-based compound, and a cyanine-based compound. For example, the light control layer AR may include any one of a tetraazaporphyrin-based compound, a cyanine-based compound, a squarylium-based compound, an oxazine-based compound, or any combination thereof.

The light control layer AR may contain the colorant CR in about 0.01 wt % to about 5.00 wt % with respect to the total weight of the light control layer AR. When the light control layer AR contains less than about 0.01 wt % of the colorant CR, the color gamut may not be improved because light in a specific wavelength range may not be sufficiently absorbed. When the light control layer AR contains greater than 5.00 wt % of the colorant CR, aggregation of the dye and/or the pigment may occur.

In an embodiment, the light-absorbing particles NP may absorb ultraviolet light incident onto the light control layer AR. The light-absorbing particles NP may have an absorption wavelength of about 370 nm to about 400 nm. The light control layer AR according to an embodiment may include the light-absorbing particles NP, and may have a transmittance of about 10% or less with respect to light having a wavelength of about 370 nm to about 400 nm.

The light control layer AR may have different transmittances before and after being irradiated with (e.g., exposed to) light having a wavelength of about 370 nm to about 400 nm. The change in transmittance of the light control layer AR may be due to a change in an absorption wavelength range of the colorant CR. When the colorant CR is irradiated with light having a wavelength of about 370 nm to about 400 nm, the compound structure of the colorant CR may be changed. The colorant CR in which the compound structure is changed may have a different absorption wavelength range. For example, if the colorant CR is an organic material including a carbon-carbon double bond, the carbon-carbon double bond of the organic material may be destroyed when the colorant CR is irradiated with light having a wavelength of about 370 nm to about 400 nm, and thus the absorption wavelength range of the colorant CR may be changed.

The light control layer AR according to an embodiment, including the light-absorbing particles NP that absorb light having a wavelength of about 370 nm to about 400 nm, may reduce or minimize the effect of light having a wavelength of about 370 nm to about 400 nm on the colorant CR. Accordingly, the light reliability (e.g., stability) of the electronic device ED including the light control layer AR according to an embodiment may be secured by reducing or minimizing a change in the absorption wavelength range of the colorant CR and reducing or minimizing a change in transmittance of the light control layer AR.

In addition, the light control layer AR according to an embodiment may include the light-absorbing particles NP that absorb light having a wavelength of about 370 nm to about 400 nm, and thus a change in transmittance of the light control layer AR may be reduced or minimized even without a separate light-absorbing layer on the light control layer AR. Accordingly, the light reliability of the electronic device ED including the light control layer AR according to an embodiment may be secured without any additional process.

The light control layer AR according to an embodiment has a first transmittance with respect to visible light prior to irradiation with light having a wavelength of about 370 nm to about 400 nm, and has a second transmittance with respect to visible light after irradiation with light having a wavelength of about 370 nm to about 400 nm, and the absolute value of the difference between the first transmittance and the second transmittance may be about 10% or less. Accordingly, the electronic device ED (e.g., shown in FIG. 1) including the light control layer AR according to an embodiment may have excellent or suitable light reliability (e.g., stability).

The light-absorbing particles NP may include at least one of $SiO_2$, $TiO_2$, $CeO_2$, $ZnO$, $ZrO_2$, $Al_2O_3$, $CaCO_3$, $MgO$, $GeO_2$, or $Y_2O_3$. The light control layer AR may contain about 0.01 wt % to about 5.00 wt % of the light-absorbing particles NP with respect to the total weight of the light control layer AR. When the light control layer AR contains less than about 0.01 wt % of the light-absorbing particles NP with respect to the total weight of the light control layer AR, absorption of ultraviolet light by the light-absorbing particles NP is insufficient, and thus the colorant CR may not be protected from ultraviolet light. When the light control layer AR contains greater than about 5.00 wt % of the light-absorbing particles NP with respect to the total weight of the light control layer AR, the dispersion degree of the light-absorbing particles NP in the base part BP may be reduced, and accordingly, the degree of ultraviolet light absorption may vary depending on the position of the light control layer AR on a plane, so that the light control layer may not secure the light reliability. That is, when the light control layer AR contains greater than about 5.00 wt % of the light-absorbing particles NP, the dispersion of the light-absorbing particles NP in the base part BP may not be uniform, and accordingly, the ultraviolet light absorption may not be uniform in the light control layer AR, so that the light control layer may not have the suitable light stability.

Meanwhile, although the light-absorbing particles NP are illustrated as having a spherical shape in FIG. 5, this is only an example and an embodiment of the present disclosure is not limited thereto. For example, the light-absorbing particles NP may have a spherical shape, a cubic shape, a wire shape, or a hollow shape. When the light-absorbing particles NP have a substantially spherical shape, the light-absorbing particles NP may have an average diameter (e.g., average particle size) of about 5 nm to about 100 nm. When the light-absorbing particles NP have an average diameter of less than about 5 nm, it becomes difficult to equalize the size of the nanoparticles. When the absorbing particles NP have an average diameter of greater than about 100 nm, scattering of light by the light-absorbing particles NP increases and power efficiency decreases. Here, the average particle diameter may be, for example, a median particle diameter or size (D50) measured utilizing a laser diffraction particle size distribution meter.

In an embodiment, the base part BP may be a dispersion medium of the colorant CR and the light-absorbing particles NP. The base part BP may be derived from a base resin composition including at least one of an acrylate monomer or an epoxy monomer. The base resin composition may include about 25 wt % to about 35 wt % of at least one of an acrylate monomer or an epoxy monomer, about 0.01 wt % to about 5.00 wt % of a photoinitiator, and one or more additives.

The photoinitiator may be any one selected from among 2,2-dimethoxy-1,2-diphenylethan-1-one, 1-hydroxy-cyclohexyl-phenyl-ketone, 22-hydroxy-2-methyl-1-phenyl-1-propanone, 2-hydroxy-1-[4-(2-hydroxyethoxy)phenyl]-2-methyl-1-propanone, and 2-hydroxy-1-{4-[4-(2-hydroxy-2-methyl-propionyl)-benzyl]-phenyl}-2-methylpropan-1-one.

In an embodiment, the photoinitiator may be any one selected from among 2-methyl-1[4-(methylthio)phenyl]-2-morpholinopropan-1-one, 2-benzyl-2-dimethylamino-1-(4-morpholinophenyl)-butanone-1,2-dimethylamino-2-(4-methyl-benzyl)-1-(4-morpholin-4-yl-phenyl)-butan-1-one, 2,4,6-trimethylbenzoyl-diphenylphosphine oxide, 2,4,6-trimethylbenzoyl-diphenyl phosphinate, bis(2,4,6-trimethyl-benzoyl)-phenylphosphineoxide, [1-(4-phenylsulfanylbenzoyl)heptylideneamino]benzoate, [1-[9-ethyl-6-(2-methylbenzoyl)carbazol-3-yl]ethylideneamino] acetate, and bis(2,4-cyclopentadienyl)bis[2,6-difluoro-3-(1-pyrryl)phenyl] titanium(IV).

Meanwhile, the electronic device ED according to an embodiment may not include a color filter layer. That is, the electronic device ED according to an embodiment may exclude a color filter layer. The electronic device ED according to an embodiment may include an inorganic deposition layer INF and a light control layer AR containing the colorant CR to replace the color filter layer function (e.g., to provide the function of the color filter layer). For example, the electronic device may include the inorganic deposition layer INF and the light control layer AR to adjust the color tone of the electronic device ED viewed by the user.

Figure 6A:
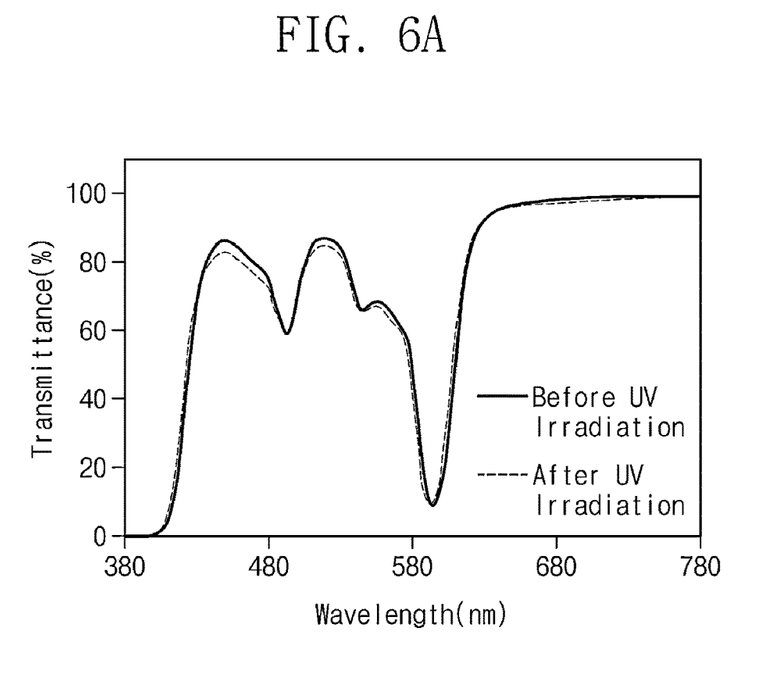
FIG. 6A is a graph showing transmittance versus wavelength before and after a light control layer according to the Example was irradiated with ultraviolet light.
Figure 6B:
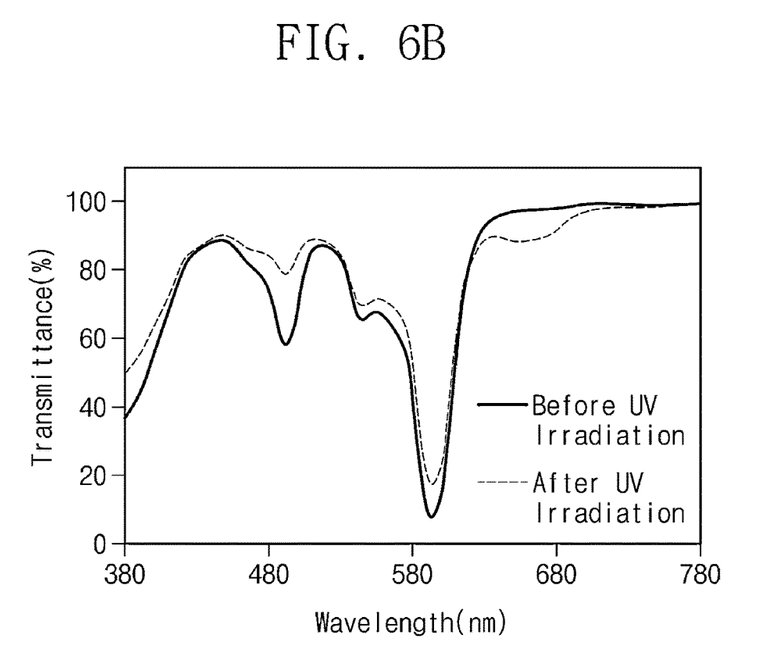
FIG. 6B is a graph showing transmittance versus wavelength before and after a light control layer according to the Comparative Example was irradiated with ultraviolet light.

FIG. 6A is a graph showing transmittance versus wavelength before and after a light control layer according to the Example is irradiated with ultraviolet light. FIG. 6B is a graph showing transmittance versus wavelength before and after a light control layer according to the Comparative Example is irradiated with ultraviolet light.

In FIG. 6A, measurement of transmittance for each wavelength before and after irradiation with ultraviolet light is performed on the light control layer AR (FIG. 5) according to the Example. As illustrated in FIG. 5, the light control layer AR (FIG. 5) according to the Example includes a base part BP (FIG. 5), a colorant CR (FIG. 5), and light-absorbing particles NP (FIG. 5). In FIG. 6B, measurement of transmittance for each wavelength before and after irradiation with ultraviolet light is performed on the light control layer according to the Comparative Example. The light control layer according to the Comparative Example has substantially the same structure as in the Example except that the light-absorbing particles NP (FIG. 5) are not included in the light control layer AR (FIG. 5).

Referring to FIG. 6A, it may be seen that the light control layer AR (FIG. 5) according to the Example has little change (e.g., substantially no change) in transmittance before and after irradiated with ultraviolet light. For example, it may be seen that the change in transmittance of the light control layer AR (FIG. 5) of the Example before and after the light control layer is irradiated with ultraviolet light at each wavelength of about 480 nm, about 580 nm, and about 680 nm is about 5% or less.

Referring to FIG. 6B, it may be seen that the light control layer of the Comparative Example has a greater change (e.g., substantial change) in transmittance before and after the light control layer of the Comparative Example is irradiated with ultraviolet light than the light control layer AR of the Example. For example, it may be seen that, in the light control layer AR (FIG. 5) of the Comparative Example, the change in transmittance before and after irradiation with ultraviolet light at each wavelength of about 480 nm, about 580 nm, and about 680 nm is greater than about 5%.

Accordingly, when the light control layer AR (FIG. 5) includes the light-absorbing particles NP (FIG. 5) that absorb ultraviolet light, it may be seen that the change in transmittance of the light control layer AR (FIG. 5) is small. It is considered that the light-absorbing particles NP (FIG. 5) included in the light control layer AR (FIG. 5) absorb ultraviolet light, thereby reducing the effect of ultraviolet light on the colorant CR (FIG. 5), and thus the change in transmittance of the light control layer AR (FIG. 5) decreases.

Figure 7:
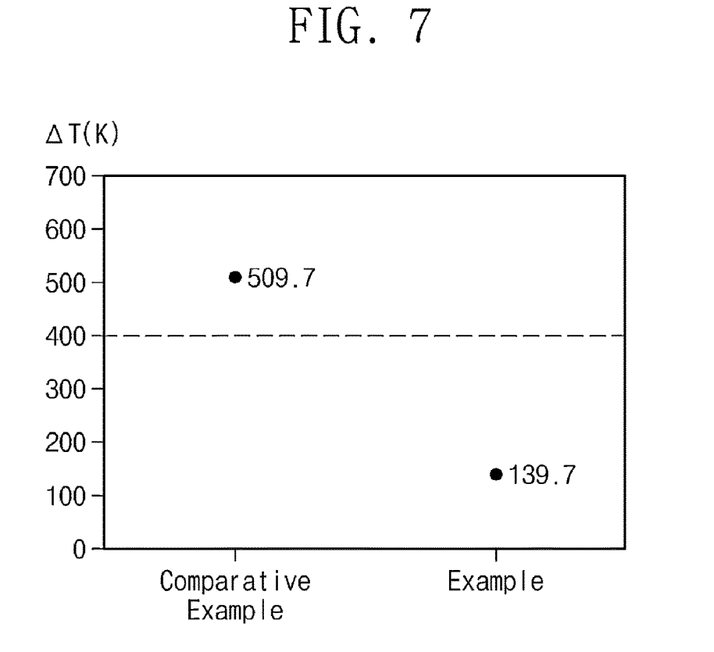
FIG. 7 is a graph showing a color temperature variation of a light control layer according to an embodiment.
Figure 8:
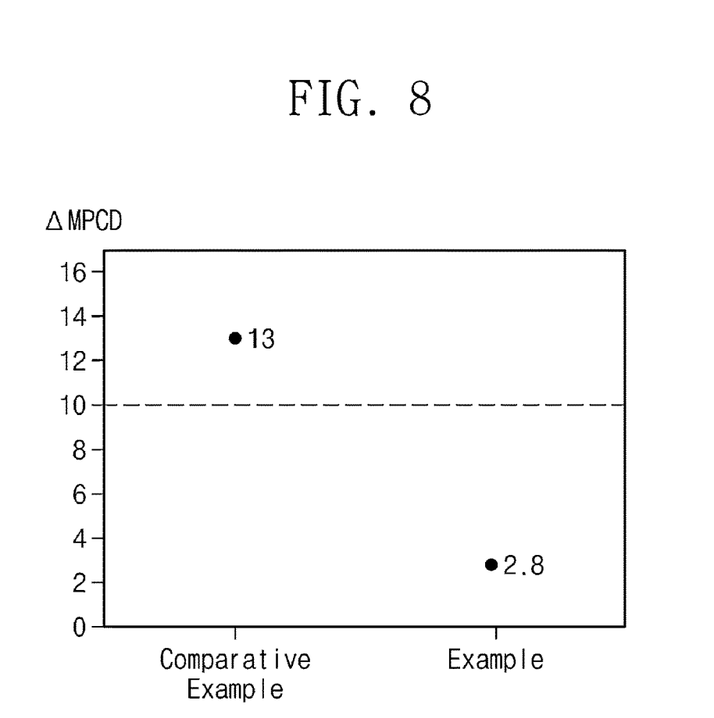
FIG. 8 is a graph showing a minimum perceptible color difference (MPCD) variation of a light control layer according to an embodiment.
Figure 9A:
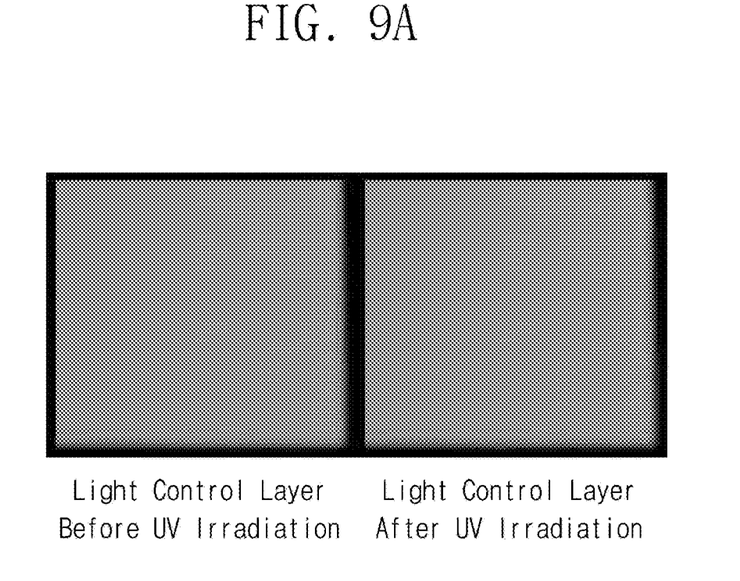
FIG. 9A is an image showing a color tone change before and after a light control layer according to the Example was irradiated with ultraviolet light.
Figure 9B:
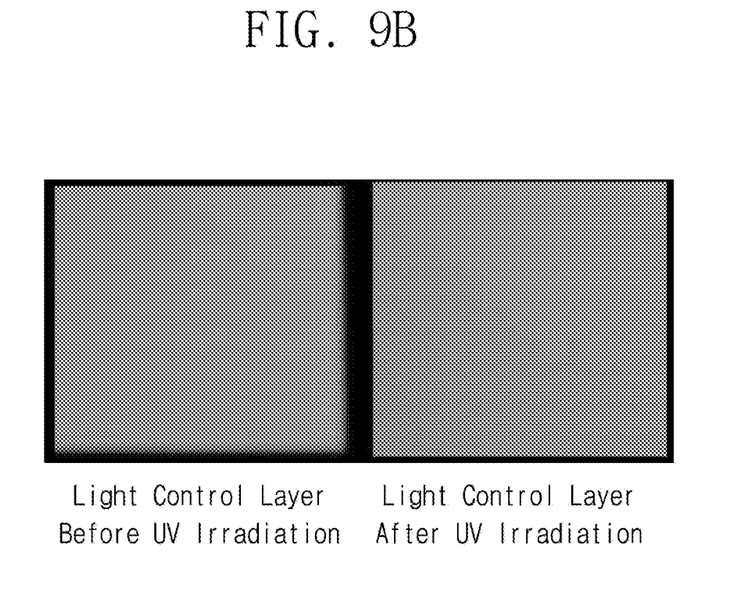
FIG. 9B is an image showing a color tone change before and after a light control layer according to the Comparative Example was irradiated with ultraviolet light.

FIG. 7 is a graph showing a color temperature variation of a light control layer according to an embodiment and a comparative example. FIG. 8 is a graph showing a minimum perceptible color difference (MPCD) variation of a light control layer according to an embodiment and a comparative example. FIG. 9A is an image showing a color tone change before and after a light control layer according to the Example is irradiated with ultraviolet light. FIG. 9B is an image showing a color tone change before and after a light control layer according to the Comparative Example is irradiated with ultraviolet light.

Color temperature is a value expressed numerically utilizing the absolute temperature of the color of the light source. The closer the color of the light source is to red, the lower the color temperature, and the closer the color of the light source is to blue, the higher the color temperature. MPCD is a numerical representation of the minimum perceptible color difference.

If an arbitrary color coordinate is (x,y), the color temperature may be derived from Equations 1 and 2.

$$\text{color temperature}=437*n^3+3701*n^2+6861*n+5517 \quad \text{[Equation 1]}$$

In Equation 1, n may be derived from Equation 2 below.

$$n=(x-0.3320)/(0.1858-y) \quad \text{[Equation 3]}$$

If an arbitrary color coordinate is (x,y), the MPCD may be derived from Equations 3 to 5 below.

$$\text{MPCD}=\Delta(u*v)/0.0005 \quad \text{[Equation 3]}$$

In Equation 3, u may be derived from Equation 4 below, and v in Equation 3 may be derived from Equation 5 below.

$$u=4x/(-2x+12y+3) \quad \text{[Equation 4]}$$

$$v=6y/(-2x+12y+3) \quad \text{[Equation 5]}$$

(Color Temperature Variation, MPCD Variation, and Color Tone Change Evaluation Target)

In FIGS. 7 to 9B, the light control layer AR (FIG. 5) of the Example includes light-absorbing particles NP (FIG. 5) that absorb light in a wavelength range of about 400 nm or less. The light control layer of the Comparative Example absorbs light in a wavelength region of about 370 nm or less. It has substantially the same structure as the light control layer AR (FIG. 5) of the Example except that the light control layer includes light-absorbing particles that do not absorb light in a wavelength region of about 370 nm to about 400 nm. That is, the Comparative Example does not include light-absorbing particles that absorb light in the wavelength region of about 370 nm to about 400 nm.

(Color Temperature Variation Evaluation Method)

In the color temperature variation in FIG. 7, the color temperature difference (ΔT) between the light control layer prior to exposure to ultraviolet light and the light control layer exposed to ultraviolet light for 80 hours was measured 10 times, and the average value of the 10 measurements was shown. When the color temperature variation was 400 K or less, the light control layer satisfies the light reliability standard.

(Color Temperature Variation Evaluation Result)

Referring to FIG. 7, the light control layer AR (FIG. 5) of the Example has a color temperature difference (ΔT) of 400 K or less (e.g., 139.7 K), and the light control layer AR (FIG. 5) of the Comparative Example has a color temperature difference of about greater than 400 K (e.g., 509.7 K). That is, when the light-absorbing particles NP (FIG. 5) are included in the light control layer AR (FIG. 5), it may be seen that even when the light control layer AR (FIG. 5) is irradiated with ultraviolet light, the color temperature change of the light control layer AR (FIG. 5) is small. Unlike the light-absorbing particles of the Comparative Example, the light-absorbing particles NP (FIG. 5) of the Example absorb light having a wavelength of about 370 nm to about 400 nm. Therefore, it is considered that the light-absorbing particles NP (FIG. 5) of the Example absorb light having a wavelength of about 370 nm to about 400 nm to prevent or reduce (e.g., protect from) a change in physical properties of the light control layer AR (FIG. 5) due to ultraviolet light.

(MPCD Variation Evaluation Method)

In MPCD variation shown in FIG. 8, a difference between the MPCD in the light control layer prior to exposure to ultraviolet light and the MPCD in the light control layer exposed to ultraviolet light for 80 hours was measured 10 times, and the average value of the 10 measurements was shown. When the MPCD variation was 10 or less, the light control layer satisfies the light reliability standard.

(MPCD Variation Evaluation Result)

Referring to FIG. 8, it may be seen that the MPCD variation of the light control layer AR (FIG. 5) of the Example is 10 or less (e.g., 2.8), and the MPCD variation of the light control layer of the Comparative Example exceeds 10 (e.g., 13). That is, when the light-absorbing particles NP (FIG. 5) that absorb light having a wavelength of about 370 nm to about 400 nm are included in the light control layer AR (FIG. 5), it may be seen that even when the light control layer AR (FIG. 5) is irradiated with ultraviolet light, MPCD variation of the light control layer AR (FIG. 5) is small. Unlike the light-absorbing particles of the Comparative Example, the light-absorbing particles NP (FIG. 5) of Example absorb light having a wavelength of about 370 nm to about 400 nm. Therefore, it is considered that the light-absorbing particles NP (FIG. 5) of the Example absorb light having a wavelength of about 370 nm to about 400 nm to prevent or reduce a change in physical properties of the light control layer AR (FIG. 5).

(Color Tone Change Evaluation Method)

The color change in FIGS. 9A and 9B is an observation of the color tone change of the light control layer prior to exposure to ultraviolet light and after exposure to ultraviolet light for 80 hours.

(Color Tone Change Evaluation Result)

Referring to FIGS. 9A and 9B, it may be seen that the light control layer AR (FIG. 5) of the Example does not have a color tone change before and after exposure to ultraviolet light. On the other hand, it may be seen that the light control layer of the Comparative Example turned red after exposure to ultraviolet light. Unlike the light-absorbing particles of the Comparative Example, the light-absorbing particles NP (FIG. 5) of the Example absorb light having a wavelength of about 370 nm to about 400 nm. Therefore, it is considered that the light-absorbing particles NP (FIG. 5) of the Example absorb light having a wavelength of about 370 nm to about 400 nm to prevent or reduce a color tone change of the light control layer AR (FIG. 5).

The electronic device according to an embodiment may include a light control layer including light-absorbing particles, so that light reliability (e.g., light stability) may be improved. The light-absorbing particles may absorb ultraviolet light, thereby reducing the variation of the absorption wavelength range of the colorant by ultraviolet light. In addition, an electronic device according to an embodiment includes a light control layer containing light-absorbing particles, accordingly, improved light reliability may be exhibited without a process of forming a separate layer that absorbs ultraviolet light on the light control layer.

An electronic device according to an embodiment includes a light control layer containing light-absorbing particles and having small change in absorption wavelength range, and may thus have excellent light reliability.

As used herein, the term "and/or" includes any and all combinations of one or more of the associated listed items. Throughout the disclosure, the expression "at least one of a, b or c", "at least one selected from a, b, and c", "at least one selected from the group consisting of a, b, and c", "at least one from among a, b, and c", etc., indicates only a, only b, only c, both (e.g., simultaneously) a and b, both (e.g., simultaneously) a and c, both (e.g., simultaneously) b and c, all of a, b, and c, or variations thereof.

The use of "may" when describing embodiments of the present disclosure refers to "one or more embodiments of the present disclosure".

As used herein, the terms "substantially", "about", and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

The electronic apparatus, the display device, and/or any other relevant devices or components according to embodiments of the present invention described herein may be implemented utilizing any suitable hardware, firmware (e.g. an application-specific integrated circuit), software, or a combination of software, firmware, and hardware. For example, the various components of the device may be formed on one integrated circuit (IC) chip or on separate IC chips. Further, the various components of the device may be implemented on a flexible printed circuit film, a tape carrier package (TCP), a printed circuit board (PCB), or formed on one substrate. Further, the various components of the device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the embodiments of the present disclosure.

Although the embodiments of the present disclosure have been described, it is understood that the present disclosure should not be limited to these embodiments but various suitable changes and modifications can be made by one ordinary skilled in the art within the spirit and scope of the present disclosure as hereinafter claimed, and equivalents thereof.

What is claimed is:

1. An electronic device comprising:
a base layer;
a light-emitting element layer on the base layer and comprising a pixel defining film in which an opening is defined and a light-emitting layer in the opening, the light-emitting element layer further comprising a first electrode and a second electrode with the light-emitting layer therebetween;
an inorganic deposition layer on the light-emitting element layer;
an encapsulation layer on the inorganic deposition layer; and
a light control layer on the encapsulation layer and comprising a base part, light-absorbing particles having a maximum absorption wavelength of about 370 nm to about 400 nm, and a colorant.

2. The electronic device of claim 1, wherein the light-absorbing particles are about 0.01 wt % to about 5.00 wt % in amount in the light control layer based on a total weight of the light control layer.

3. The electronic device of claim 2, wherein the light-absorbing particles comprise at least one of $SiO_2$, $TiO_2$, $CeO_2$, ZnO, $ZrO_2$, $Al_2O_3$, $CaCO_3$, MgO, GeO2, or $Y_2O_3$.

4. The electronic device of claim 1, wherein the light-absorbing particles have an average diameter of about 5 nm to about 100 nm.

5. The electronic device of claim 1, wherein the colorant comprises at least one of an anthraquinone-based compound, a phthalocyanine-based compound, an azo-based compound, a perylene-based compound, a xanthene-based compound, a dimonium-based compound, a dipyrromethene-based compound, a tetraazaporphyrin-based compound, a porphyrin-based compound, a squarylium-based compound, an oxazine-based compound, a triarylmethane-based compound, or a cyanine-based compound.

6. The electronic device of claim 1, further comprising a sensor layer between the encapsulation layer and the light control layer,
wherein the sensor layer is directly on the encapsulation layer.

7. The electronic device of claim 1, wherein the inorganic deposition layer comprises at least one of Al, Ag, Mg, Cr, Ti, Ni, Au, Ta, Cu, Ca, Co, Fe, Mo, W, Pt, Yb, $SiO_2$, $TiO_2$, $ZrO_2$, $Ta_2O_5$, $HfO_2$, $Al_2O_3$, ZnO, $Y_2O_3$, BeO, MgO, $PbO_2$, $WO_3$, SiNx, LIF, $CaF_2$, $MgF_2$, or CdS.

8. The electronic device of claim 1, wherein the light control layer has a minimum perceptible color difference (MPCD) change amount before and after irradiation with ultraviolet light of about 10 or less.

9. The electronic device of claim 1, wherein the light control layer has a transmittance of about 10% or less with respect to light having a wavelength of about 370 nm to about 400 nm.

10. The electronic device of claim 1, wherein the light control layer is provided as a single layer.

11. The electronic device of claim 1, wherein the inorganic deposition layer is provided as a single layer.

12. An electronic device divided into a light-emitting region and a non-light-emitting region adjacent to the light-emitting region, the electronic device comprising:
a display module; and
a window on the display module,
wherein the display module comprises:
a base layer;
a light-emitting element layer on the base layer and comprising a pixel defining film in which an opening overlapping the light-emitting region is defined, and a light-emitting layer in the opening, the light-emitting element layer further comprising a first electrode and a second electrode with the light-emitting layer therebetween;
an inorganic deposition layer on the light-emitting element layer;
an encapsulation layer on the inorganic deposition layer; and
a light control layer on the encapsulation layer and comprising a base part, light-absorbing particles, and a colorant, the light control layer having a transmittance of about 10% or less with respect to light having a wavelength of about 370 nm to about 400 nm, and the light-absorbing particles comprise at least one of $SiO_2$, $TiO_2$, $CeO_2$, ZnO, $ZrO_2$, $Al_2O_3$, $CaCO_3$, MgO, $GeO_2$, or $Y_2O_3$.

13. The electronic device of claim 12, wherein the light-absorbing particles have a maximum absorption wavelength in a range of about 370 nm to about 400 nm.

14. The electronic device of claim 12, wherein the light-absorbing particles are about 0.01 wt % to about 5.00wt % in amount in the light control layer based on a total weight of the light control layer.

15. The electronic device of claim 12, wherein the light-absorbing particles have an average diameter of about 5 nm to about 100 nm.

16. The electronic device of claim 12, wherein the light control layer overlaps the light-emitting region and the non-light-emitting region, and is provided as a single layer.

17. The electronic device of claim 16, wherein the light control layer is on an uppermost part of the display module.

18. The electronic device of claim 12, wherein the inorganic deposition layer overlaps the light-emitting region and the non-light-emitting region, and is provided as a single layer.

19. The electronic device of claim 12, wherein the inorganic deposition layer comprises at least one of Al, Ag, Mg, Cr, Ti, Ni, Au, Ta, Cu, Ca, Co, Fe, Mo, W, Pt, Yb, $SiO_2$, $TiO_2$, $ZrO_2$, $Ta_2O_5$, $HfO_2$, $Al_2O_3$, ZnO, $Y_2O_3$, BeO, MgO, $PbO_2$, $WO_3$, SiNx, LIF, $CaF_2$, $MgF_2$, or CdS.

20. The electronic device of claim 12, wherein the light control layer is free from any polarization layer.

* * * * *